Figure 1:
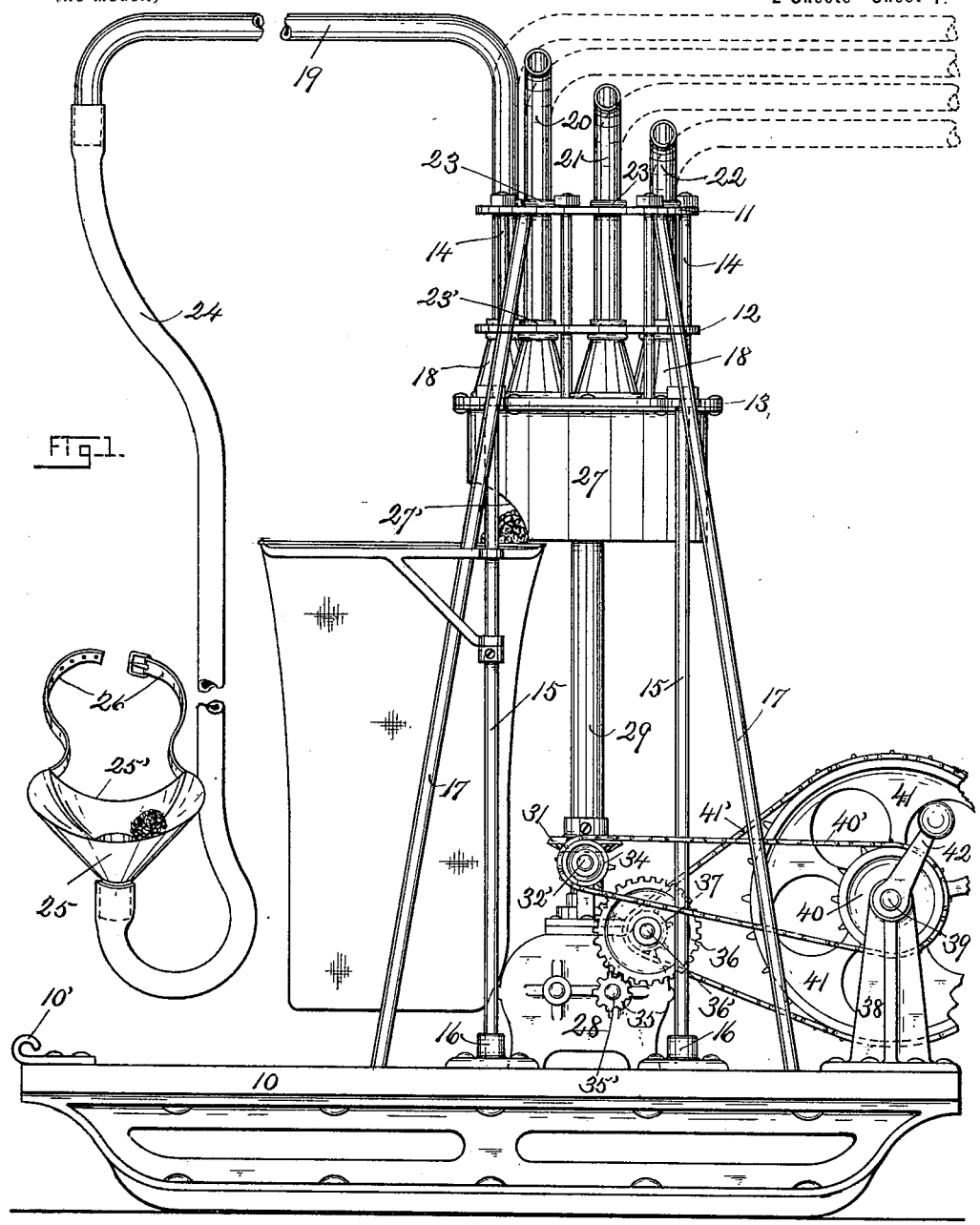

No. 631,373. Patented Aug. 22, 1899.
C. J. LUCE.
COTTON PICKING MACHINE.
(Application filed June 27, 1898.)
(No Model.) 2 Sheets—Sheet 1.

WITNESSES

INVENTOR,
Charles J. Luce,
BY
Frank H. Allen,
ATTORNEY.

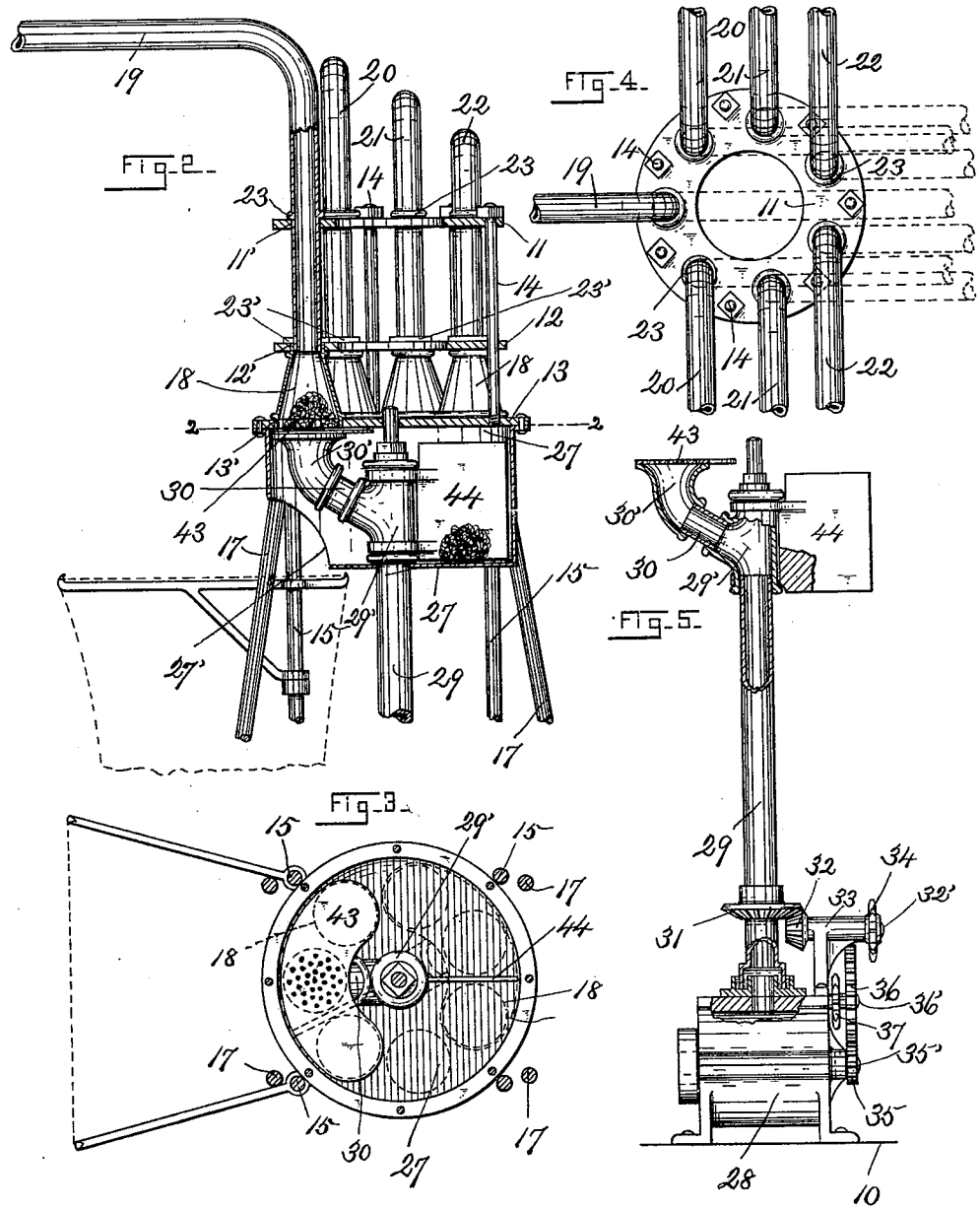

UNITED STATES PATENT OFFICE.

CHARLES J. LUCE, OF NIANTIC, CONNECTICUT.

COTTON-PICKING MACHINE.

SPECIFICATION forming part of Letters Patent No. 631,373, dated August 22, 1899.

Application filed June 27, 1898. Serial No. 684,598. (No model.)

*To all whom it may concern:*

Be it known that I, CHARLES J. LUCE, a citizen of the United States, residing at Niantic, in the county of New London and State of Connecticut, have invented certain new and useful Improvements in Cotton-Picking Machines, of which the following is a full, clear, and exact description.

The object of this invention is to provide a light and portable machine of simple construction for use in the operation of cotton-picking which shall automatically collect the cotton picked by several pickers and deposit it in a receptacle common to them all, said machine being capable of being moved from place to place as often as the cotton in a given locality is gathered.

Briefly described, my machine embodies, in connection with the receptacle just mentioned, several pipes leading thereinto, the opposite ends of which pipes are each connected by means of a flexible section with an individual receptacle provided for the picker, into which said picker deposits the cotton as fast as it is picked. In connection with the above a blower is provided, whereby the cotton placed in the said individual receptacles is drawn pneumatically therefrom through the pipes mentioned and into the said main receptacle. The construction of my machine is such that it is not necessary to provide a blower of sufficient capacity to force a current of air simultaneously through the said several pipes, as but one of said pipes is in operative connection with the blower at any one time. By means of suitable mechanism embodied in my machine I make it possible to transfer said current very rapidly and in turn to each of said pipes, providing thereby a practically continuous current for them all. I thus make it possible to use a small and light blower, requiring but little power to drive it.

My machine embodies mechanism for driving the blower, as just mentioned, and for transferring its current successively to the several pipes, as well as mechanism whereby the cotton deposited in the individual receptacles is automatically emptied into a bag or like article, all of which is hereinafter more fully described.

Having now described in a general way the construction and operation of my machine, I will proceed to give a more detailed description thereof in connection with the accompanying drawings, which serve to illustrate the same, as follows:

Figure 1 is a side elevation of my newly-invented machine, showing the same suitably mounted upon a sled or drag. Fig. 2 shows largely in central vertical section the upper portion of my machine. Fig. 3 is a horizontal sectional view taken on line 2 2 of Fig. 2. Fig. 4 is a plan view of the upper portion of my machine. Fig. 5 shows in elevation and central section the blower and connected parts.

Referring to the drawings, the reference-number 10 denotes a sled or drag upon which my newly-invented machine is mounted, said sled being drawn usually by means of a horse or mule secured to the hook 10' at the front end of said sled.

A portion of the mechanism of my machine is supported in a metallic framework, consisting of three superimposed disks 11, 12, and 13, whose centers are in vertical alinement, which said disks are secured together by vertical rods 14, arranged concentric to the vertical central line of said disks, thereby forming a device very similar to a trundle or lantern, as will be clearly understood by reference to the drawings. The framework just described is supported by four posts 15, whose lower ends are secured in sockets or bosses 16, located on the sled 10, and whose upper ends are secured to the disk 13. It will now be seen that the framework described provides a skeleton tower, which is preferably stiffened by means of braces 17, secured at their lower ends to the sled 10 and at their upper ends to the disk 11. The disks 11, 12, and 13 have each cut therethrough, near their peripheries and concentric to their centers, a ring of circular holes 11', 12', and 13', respectively, (shown in the drawings as seven in number,) and the centers of which said holes of each disk are in vertical alinement with the corresponding holes of the companion disks. The disks 13 and 12 have located between them a ring of cones 18, formed, preferably, of thin sheet metal, the upper (smaller) end of each of which cones is received in a hole 12' of disk 12 and the lower (larger) end in a hole 13' of disk 13.

I have already mentioned certain pipes through which the cotton is drawn from the individual receptacles of the pickers and transferred to the main receptacle of the machine. One of such pipes is provided in connection with each cone 18, said pipes being preferably arranged in two sets of three each, such sets being located on opposite sides of the machine and adapted to extend at right angles thereto in opposite directions, the said pipes of each set being of different lengths in order that points at varying distances from the machine may be reached by the pickers. In addition to the two sets of pipes just mentioned a similar pipe is also provided, leading from the central line of the machine over and to point in advance of the mule, which draws the complete machine. The last-named of said pipes I have denoted by the reference-number 19, while those of each set are denoted, respectively, by reference-numbers 20, 21, and 22. The pipes 19, 20, 21, and 22 are swiveled in their respective cones and extend thence upward through the plate 11. They are then bent outward away from the machine in varying directions.

Formed near the lower end of each of the above-mentioned pipes is an annular flange 23, adapted to engage the upper face of disk 11 when the pipe end has entered the smaller upper end of the cone 18, said flange forming a broad support for the said pipes.

The described arrangement of pipes, disks, and cones serves to support the pipes in vertical positions, but allows them to be freely rotated and adjusted within the disks in order that they may follow the movements of the several pickers.

To insure a tight joint between the ends of pipe portions 19 and the upper smaller ends of the cones 18, a washer 23', of rubber or the like material, may, if necessary, be placed around pipe portions 19 just before their insertion into the said cones.

The pipes 19, 20, 21, and 22 are connected by means of flexible pipes 24 to the individual receptacles 25 of the pickers. Said receptacles 25 are preferably flaring, as shown in Fig. 1, and are provided with the inwardly-curved portion 25', adapted to conform to the shape of the body. They are also provided with straps 26, whereby said receptacles are secured to the pickers, preferably at about the elevation of the hips, so that the mouth of the receptacle may not be closed by reason of the stooping of the picker, as would be the case should said receptacle be secured around the waist.

The main receptacle of my device, to which reference has heretofore been made, is denoted by the reference-number 27 and is preferably cylindrical in shape and formed of sheet metal. Said receptacle is located directly beneath the disk 13, is secured thereto in any suitable manner, and is of sufficient size to surround the lower ends of the entire series of cones 18.

It will now be readily seen that if a current of air be drawn or forced through the connecting-pipes into the main receptacle 27 any cotton placed in the individual receptacles 25 will be carried through said pipes into the receptacle 27, which is common to all of the pipes. To collect the cotton gathered by the several pickers, I provide such a current of air; but to avoid the necessity of providing a separate current for each individual receptacle, which plan if followed would necessitate a very powerful blower, I have made it possible to utilize a blower of sufficient capacity for a single pipe only, and by certain novel mechanism I transfer such current from pipe to pipe in rapid succession, thus providing a practically continuous current for all of the pipes.

Referring now to Figs. 1, 2, and 5 of the drawings, the reference-number 28 denotes a blower of any practical construction, and 29 indicates a vertical tubular shaft mounted on said blower and journaled at its upper end in the center of disk 13. The lower end of the tubular shaft 29 is journaled in the upper portion of the blower-case by means of the well-known liquid-joint or by any other means that will permit the rotation of said shaft and at the same time provide an air-tight joint. Shaft 29 passes through the bottom of the receptacle 27 and bears on its upper end a fitting 29', and leading from said fitting 29' within receptacle 27 is a branch pipe 30, bearing an elbow 30', whose upper end is parallel with and directly beneath the lower face of the disk 13. The center of said upper end is in vertical alinement with the said vertical central line of the cones 18.

Located on the tubular shaft 29, somewhat above the blower 28, is a bevel-gear 31, meshing with a companion bevel-gear 32, whose shaft 32' is journaled in a stand 33, secured to the upper portion of the blower-case 28, which shaft 32' also bears a sprocket 34.

The meshing gears (denoted by reference-numbers 35 36) form a portion of the driving mechanism of the blower, the latter serving to drive the former, which said gear 35 is mounted upon the projecting end of the journal 35' of the fan-blower. Mounted upon the journal 36' of gear 36 is sprocket 37.

Reference-number 38 denotes a stand mounted on sled 10, having journaled in its upper portion a shaft 39, on which are mounted sprockets 40 and 41 in line, respectively, with sprockets 34 and 37 and each serving to drive the sprocket with which it is in alinement by means of sprocket-chains 40' and 41', respectively. Shaft 39 is rotated by means of a handle 42 or by any other suitable means.

It will now be readily understood from the above description and from the drawings that when shaft 39 is set in revolution it sets in operation the fans of the blower and also causes the tubular shaft 29 to revolve. When the blower is set in operation, it induces a current of air downward through the tubular shaft 29, and it will now be understood that when the open end of the arm 30 of the tubular shaft 29 is in alinement with any one of the cones 18 said current of air will draw the cotton from the individual receptacle 25 at the end of the pipe leading from said cone, and, as shaft 29 is in constant revolution, it will also be seen that said current of air will be continually transferred from cone to cone and the cotton will be removed from the several receptacles 25 in succession.

To prevent the cotton carried by the current of air from being drawn downward through shaft 29 and into the blower, I have secured to the above-mentioned upper end of the elbow 30' a plate 43, overlapping said elbow sufficiently to close not only the lower end of the cone with which said elbow may be in alinement, but also the cone on either side thereof, as will be understood by reference to Fig. 3, in which the positions of the cones 18 are denoted by dotted circles. That portion of the plate 43 directly over the elbow 30 is perforated to prevent the entrance of cotton into the elbow and to allow the free passage of the current of air through said plate 43. It will now be seen that when the cotton is drawn into the cones 18 it will remain therein until plate 43 has revolved from beneath the lower end of the cone through which the cotton was drawn, when the cotton will drop into the receptacle 27. At the front side of the machine said receptacle 27 is provided with an opening 27', and secured to the fitting 29' is a fan 44, which revolves with the tubular shaft 29 and at each revolution serves to sweep before it and out through the opening 27' all cotton which may have fallen into the receptacle 27. To catch the cotton as it is swept out of the receptacle 27, I hang a bag beneath said opening.

Having thus described my invention, I claim—

1. In combination, a circular receiver, a multiple of pipes leading into said receiver, said pipes being arranged concentrically around the center of the receiver, a suction-blower, a pipe leading from said blower into the receiver and having its end offset to register with the said pipes, and means for moving said offset pipe into successive engagement with the said pipes.

2. In combination, a receiver, a multiple of pipes connected with said receiver by cones as set forth, an exhaust-blower, and means for connecting said blower successively with said pipes, consisting of a pipe with offset end having secured thereto a perforate plate with overlapping ends.

3. In combination, a receiver with discharge-opening, a multiple of pipes leading into said receiver, means comprising a perforate revoluble disk for successively exhausting the air from said pipes into the receiver, and means for removing the contents of the receiver, consisting of a revolving plate 44, all substantially as specified.

4. In combination, a receiver, a multiple of pipes leading thereinto each pipe having a receptacle 25 at its free end, a suction-blower, a pipe revolubly mounted on the blower at one end and having its other end offset as set forth, and mechanism for simultaneously revolving the blower and said offset pipe.

Signed at New London, Connecticut, this 16th day of June, 1898.

CHARLES J. LUCE.

Witnesses:
ARTHUR B. CALKINS,
FRANK H. ALLEN.